United States Patent
Kanai et al.

(10) Patent No.: US 7,349,927 B2
(45) Date of Patent: Mar. 25, 2008

(54) TRANSACTIONAL FILE SYSTEM FOR REALIZING ATOMIC UPDATE OF PLURAL FILES BY TRANSACTIONS

(75) Inventors: Tatsunori Kanai, Kanagawa (JP); Hirokuni Yano, Kanagawa (JP); Toshiki Kizu, Kanagawa (JP); Hiroshi Yao, Kanagawa (JP); Seiji Maeda, Kanagawa (JP); Osamu Torii, Kanagawa (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 522 days.

(21) Appl. No.: 10/880,446

(22) Filed: Jul. 1, 2004

(65) Prior Publication Data

US 2004/0236793 A1 Nov. 25, 2004

Related U.S. Application Data

(62) Division of application No. 09/666,468, filed on Sep. 20, 2000, now Pat. No. 6,779,001.

(30) Foreign Application Priority Data

Sep. 29, 1999 (JP) ................... 11-276263

(51) Int. Cl.
G06F 17/30 (2006.01)
G06F 15/16 (2006.01)
(52) U.S. Cl. ........................ 707/200; 707/201
(58) Field of Classification Search ............... 707/200, 707/201
See application file for complete search history.

(56) References Cited

U.S. PATENT DOCUMENTS

| 4,507,751 A | 3/1985 | Gawlick et al. |
| 5,245,615 A | 9/1993 | Treu |
| 5,481,699 A | 1/1996 | Saether |
| 5,668,958 A | 9/1997 | Bendert et al. |
| 5,907,848 A | 5/1999 | Zaiken et al. |
| 5,987,621 A * | 11/1999 | Duso et al. ................. 709/224 |
| 6,014,673 A | 1/2000 | Davis et al. |
| 6,035,297 A | 3/2000 | Van Huben et al. |

(Continued)

FOREIGN PATENT DOCUMENTS

| JP | 04-361338 | 12/1992 |
| JP | 05-334158 | 12/1999 |

OTHER PUBLICATIONS

L. Yi Tai, pp. 5-49, 5-68 and 5-69, "Database Management System Theory and Database Design", Feb. 1997.

(Continued)

*Primary Examiner*—Tony Mahmoudi
(74) *Attorney, Agent, or Firm*—Oblon, Spivak, McClelland, Maier & Neustadt, P.C.

(57) ABSTRACT

A transactional file system configured to realize atomic update of plural files by transactions. In the transactional file system, a log entry containing information for validating all updates made by a transaction collectively on a stable memory device, is generated for one or more files updated on a buffer region by the transaction since a start of a processing of the transaction until a commit of the transaction. Then, the log entry is written into the stable memory device at a time of the commit of the transaction.

14 Claims, 9 Drawing Sheets

U.S. PATENT DOCUMENTS

| | | |
|---|---|---|
| 6,192,365 B1 | 2/2001 | Draper et al. |
| 6,289,382 B1 | 9/2001 | Bowman-Amuah |
| 6,389,420 B1 | 5/2002 | Vahalia et al. |
| 6,389,427 B1 | 5/2002 | Faulkner |

OTHER PUBLICATIONS

A. Silberschatz, et al., Four Edition, pp. 392-393, "Operating System Concepts", 1994.

M. I. Seltzer, et al., Proceedings of the International Conference on Data Engineering, vol. Conf. 9, pp. 503-510, XP-010095490, "Transaction Support in a Log-Structured File System", Apr. 19, 1993.

Y. M. Wang, et al., Fault-Tolerant Computing 1997. FTCS-27, Digest of Papers, Twenty-Seventh Annual International Symposium on Seattle, WA., IEEE COMPUT. SOC., pp. 304-308, XP-010241253, "Integrating Checkpointing With Transaction Processing", Jun. 24, 1997.

\* cited by examiner

| SEGMENT NUMBER | UTILIZATION STATE |       |      |
|----------------|-------------------|-------|------|
| 0              | VACANT            |       |      |
| 1              | VACANT            |       |      |
| 2              | IN USE            |       |      |
| 3              | 0/16              | 32/64 | 96/8 |
| 4              | 0/64              |       |      |
| 5              | 0/64              | 64/4  |      |
| ⋮              | ⋮                 |       |      |
| n              | VACANT            |       |      |

FIG.6

| FILE NAME | SIZE   | SEGMENT LIST |      |     |
|-----------|--------|--------------|------|-----|
| A         | 301980 | 2            | 6    | 4/φ |
| B         | 2508   | 5/64         |      |     |
| C         | 135210 | 11           | 9/32 |     |
| ⋮         | ⋮      | ⋮            |      |     |
| ⋮         | ⋮      | ⋮            |      |     |
| ⋮         | ⋮      | ⋮            |      |     |

FIG.7

(a) FILES UPDATED BY TRANSACTION TO BE COMMITTED (b) SEGMENTS CONSTITUTING LOG ENTRY (c) HARD DISK

FIG.8

SEGMENT MANAGEMENT INFORMATION DIFFERENCE

| SEGMENT NUMBER | UTILIZATION STATE | | | |
|---|---|---|---|---|
| 1004 | 0/8 | 8/64 | | |
| 2003 | IN USE | | | |
| 2005 | 0/16 | 16/16 | 32/64 | 96/8 |

FILE ARRANGEMENT INFORMATION DIFFERENCE

| FILE NAME | SIZE | SEGMENT LIST | |
|---|---|---|---|
| A | 62100 | 1004/8 | |
| B | 145120 | 2003 | 2005/0 |
| C | 15982 | 2005/16 | |
| D | 64000 | 2005/32 | |

SEGMENT MANAGEMENT INFORMATION DIFFERENCE

| SEGMENT NUMBER | UTILIZATION STATE | | | |
|---|---|---|---|---|
| 1004 | 0/8 | 8/64 | | |
| 2015 | IN USE | | | |
| 2005 | 0/16 | 16/16 | 32/64 | 96/8 |

FILE ARRANGEMENT INFORMATION DIFFERENCE

| FILE NAME | SIZE | SEGMENT LIST | |
|---|---|---|---|
| A | 62100 | 1004/8 | |
| B | 145120 | 2015 | 2005/0 |
| C | 15982 | 2005/16 | |
| D | 64000 | 2005/32 | |

TRANSACTIONAL FILE SYSTEM FOR REALIZING ATOMIC UPDATE OF PLURAL FILES BY TRANSACTIONS

CROSS-REFERENCE TO RELATED APPLICATIONS

The present application is a divisional application of, and claims priority to, application Ser. No. 09/666,468, filed Sep. 20, 2000, which in turn claims priority to Japanese Application No. P11-276263, filed Sep. 29, 1999. The contents of each of the above applications are incorporated herein by reference.

BACKGROUND OF THE INVENTION

1. Field of the Invention

The present invention relates to a transactional file system for updating files in response to requests for operations with respect to files.

2. Description of the Background Art

In general, the information system executes a necessary processing and returns a processing result in response to a processing request received from a terminal device or a network. Such a flow for executing a processing that is activated somehow will be referred to as a transaction. A processing of such an information system will be referred to as a transaction processing and a system for carrying out the transaction processing will be referred to as a transaction processing system.

In the transaction processing system, various data are read out and their contents are modified or new data are written according to the needs in a process of the transaction processing. Such a data update should not be lost due to fault or the like after the transaction is committed, that is, after the transaction is completed normally and its processing result is returned. Conversely, when the transaction cannot be completed normally due to fault or error in a process of the processing, the consistency of data should be maintained by aborting the transaction, that is, by cancelling data updates made up to that point. There is a need to manage transactions such that these requirements are satisfied even when a plurality of transactions are to be processed in parallel concurrently.

In the conventional transaction processing system, a database management system is provided on a file system of a computer for executing transactions, and data to be updated by the transactions are accessed through the database management system so as to satisfy these requirements in the transaction processing system. A method for realizing the transaction processing system in this manner is already well known.

In general, an operating system is provided on a general purpose computer and the operating system has a file system for managing files. Application programs will be recording data in various complex structures using files.

As a method for constructing a file system that is robust with respect to faults, a method called journaling or logging has been used. In this method, in the case of modifying meta information of a file system, that is position information of files recorded on a stable memory device such as hard disk or information for region management such as bit map or the like, its change (difference) is collectively written as a log (or journal) in a continuous region on the stable memory device, and thereafter that change is actually applied to the meta information on the hard disk. As the meta information that is changed by the operations of the files is sequentially written into the log so that a state of the file system can be recovered quickly at a time of the re-activation after the occurrence of the fault, by reading out the log from a position memorized in advance and reflecting the change of the meta information in the meta information.

There is also a log structure file system in which the log contains not just the meta information of files but also content information of files, that is data that are written into files by user programs, and the content information and the meta information are all managed to be present only in the log.

In the system for carrying out the transaction processing in which transactions update a plurality of data, target data are conventionally managed by the database management system. However, the database management system can only handle data of specific type such as tables by a specific access method, which imposes severe limitations on a way of developing programs for transaction processing.

Nowadays various transaction processing requests are exchanged through the Internet and data having various complex structures such as document data, multimedia data, design data, catalog data, e-commerce data, etc., are frequently used, so that it is becoming quite impossible to realize the transaction processing efficiently by simply using the database management system as have been done conventionally.

On the other hand, the file system can handle highly general and flexible data called files. In particular the file system using journal or log has an excellent property from a viewpoint of robustness with respect to faults. However, the file system provided by the operating system of the general purpose computer does not manage a state of file update by individual transaction so that it is impossible to realize the atomic updating, that is maintaining and managing the file system in a consistent state according to whether an update of each transaction is to be committed or aborted.

SUMMARY OF THE INVENTION

It is therefore an object of the present invention to provide a transactional file system which is capable of realizing atomic update of plural files by transactions.

According to one aspect of the present invention there is provided a transactional file management method, comprising the steps of: (a) generating a log entry containing an information for validating all updates made by a transaction collectively on a stable memory device, for one or more files updated on a buffer region by the transaction since a start of a processing of the transaction until a commit of the transaction; and (b) writing the log entry into the stable memory device at a time of the commit of the transaction.

According to another aspect of the present invention there is provided a transactional file system for managing files stored in a stable memory device and providing the files to processings by transactions, comprising: a log entry generation unit configured to generate a log entry containing an information for validating all updates made by a transaction collectively on a stable memory device, for one or more files updated on a buffer region by the transaction since a start of a processing of the transaction until a commit of the transaction; and a log entry writing unit configured to write the log entry into the stable memory device at a time of the commit of the transaction.

According to another aspect of the present invention there is provided a composite transactional file system formed by a plurality transactional file systems for managing files stored in a stable memory device and providing the files to processings by transactions, each transactional file system comprising: a log entry generation unit configured to generate a log entry containing an information for validating all updates made by a transaction collectively on a stable memory device, for one or more files updated on a buffer region by the transaction since a start of a processing of the transaction until a commit of the transaction; and a log entry writing unit configured to write the log entry into the stable memory device at a time of the commit of the transaction; wherein when one transaction updates a plurality of files in more than one transactional file systems, the log entry generation unit of each transactional file system generates the log entry containing said information for one or more files updated by said one transaction in said each transactional file system, and the log entry writing unit of each transaction file system writes the log entry into the stable memory device corresponding to said each transactional file system by embedding another information for identifying another log entry for said one transaction that is generated in another transactional file system, into the log entry.

According to another aspect of the present invention there is provided a computer usable medium having computer readable program codes embodied therein for causing a computer to function as a transactional file system for managing files stored in a stable memory device and providing the files to processings by transactions, the computer readable program codes include: a first computer readable program code for causing said computer to generate a log entry containing an information for validating all updates made by a transaction collectively on a stable memory device, for one or more files updated on a buffer region by the transaction since a start of a processing of the transaction until a commit of the transaction; and a second computer readable program code for causing said computer to write the log entry into the stable memory device at a time of the commit of the transaction.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 11, one embodiment of a transactional file system according to the present invention will be described in detail.

Figure 1:
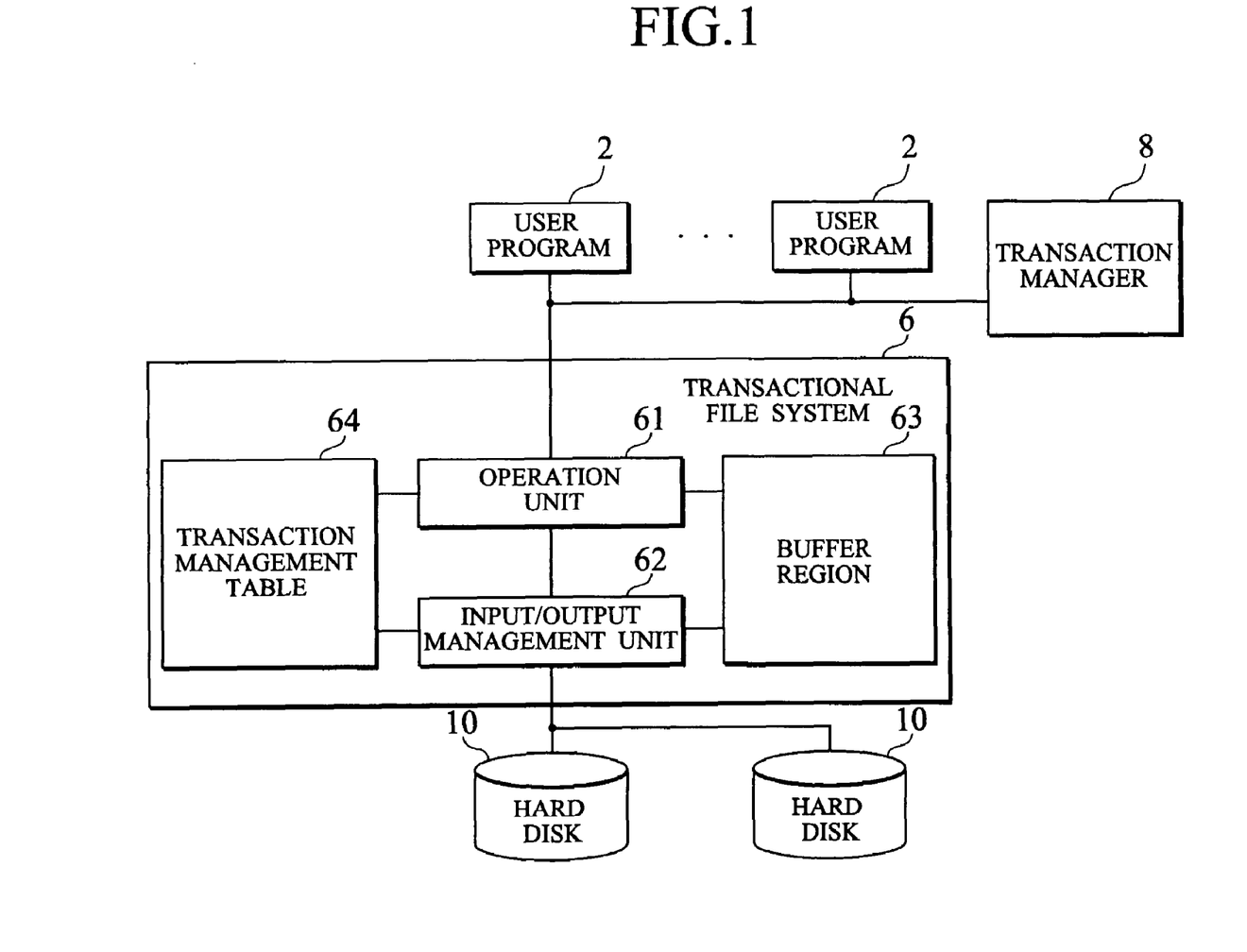
FIG. 1 is a block diagram showing an exemplary configuration of a transaction processing system according to one embodiment of the present invention.

FIG. 1 shows an exemplary configuration of a transaction processing system according to one embodiment of the present invention.

Note that, in the following description of this embodiment, a hard disk will be used as a stable memory device but it is of course also possible to use any other suitable memory device as a stable memory device. Also, in the following description of this embodiment, transactions will be generated by user programs but it should be apparent that the other cases where transactions are generated by things other than user programs are similar.

As shown in FIG. 1, a transactional file system 6 of this embodiment comprises an operation unit 61 for carrying out necessary processing upon receiving an operation request with respect to a file from a user program 2, a buffer region 63 for temporarily storing files, an input/output management unit 62 for transferring data of files between the buffer region 63 and a hard disk 10, and a transaction management table 64 for managing a list of files that are updated by each transaction that is currently being executed.

First, the outline of the transaction file system 6 will be described.

The transactional file system 6 manages regions on one or a plurality of hard disks 10, and records a content information and a meta information of a plurality of files therein.

Here, the content information of files is data written by the user programs 2 into files, and the meta information is information such as information on positions of files that is necessary for the purpose of management of the file system, and information for managing regions on the hard disks 10.

In the case where the user program 2 wishes to read or write a file, an opening of the file is commanded by specifying a name of the file to the transactional file system 6 first.

When the specified file is not present in the buffer region 63, the operation unit 61 requests the input/output management unit 62 to read that file into the buffer region 63. When this opening processing is finished, the file is read into the buffer region 63 so that thereafter the operation unit 62 that received a command for data reading/writing operation with respect to that file will carry out the reading/writing operation with respect to data of the file in the buffer region 63. Note that, in the case of creating a new file, data (content information) of the file will be created on the buffer region 63 first.

Then, the input/output management unit 62 writes back the file on the buffer region 63 to the hard disk 10 at a prescribed timing. This write back timing has conventionally been set at a constant time interval or at a random or definite timing such as when the buffer region becomes insufficient. In contrast, in this embodiment this write back timing is set at a timing of the commit of the transaction as will be described below.

In this embodiment, when the user program 2 requests a processing such as opening or reading/writing of a file to the transactional file system 6, a transaction identifier is also to be specified at the same time. This transaction identifier is issued from a transaction manager 8 in response to a request at a timing of a start of the transaction processing by the user program 2, in the case of using a configuration of the transaction processing system in which the transaction manager 8 is present as shown in FIG. 1. Apart from that, it is also possible to adopt a scheme in which the user program 2 itself generates information corresponding to the transaction identifier without using the transaction manager 8.

Figure 2:
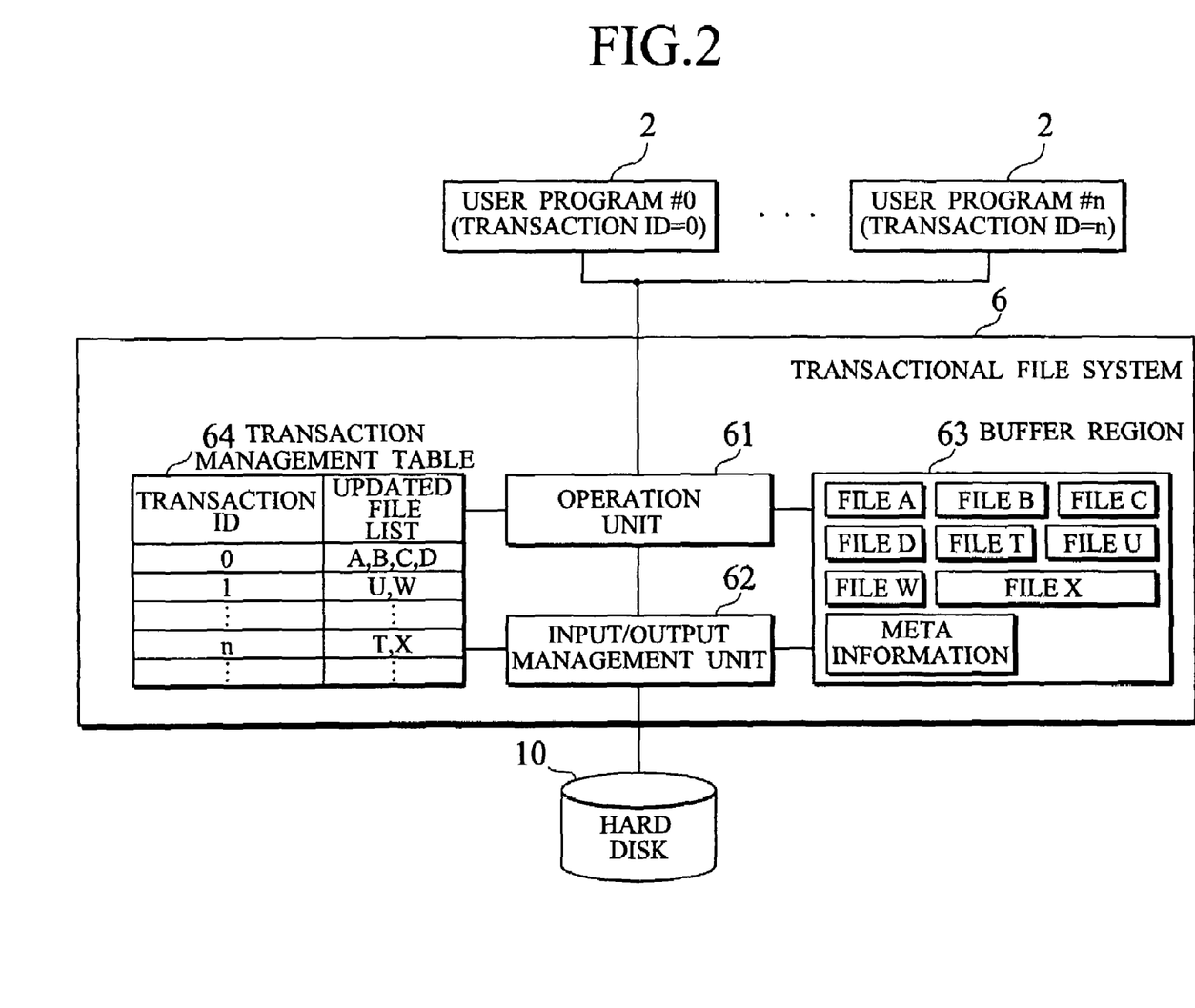
FIG. 2 is a diagram for explaining a transaction management used in the transactional processing system of FIG. 1.

The transactional file system 6 refers to the transaction identifier attached to a processing request from the user program 2, and manages which files are updated by each transaction using a transaction management table 64. FIG. 2 shows an exemplary management scheme for this purpose.

In the example of FIG. 2, it is assumed that the user program #0 is carrying out the processing with the transaction identifier=0, the user program #1 is carrying out the processing with the transaction identifier=1, and so on such that the user program #n is carrying out the processing with the transaction identifier=n. A file to be accessed by each transaction is either read out from the hard disk 10 and copied into the buffer region 63, or has its entity created directly in the buffer region 63 in the case of a newly created file. Among files present in the buffer region 63, those files which are updated or created by some transactions will have their correspondences recorded in the transaction management table 64. The transaction management table 64 is managing correspondences between each transaction and a list of files updated, created or deleted by that transaction. In FIG. 2, it is indicated that the user program #0 that executes a transaction having the transaction identifier=0 is updating four files A, B, C and D, for example.

Also, as shown in the example of FIG. 2, the buffer region 63 of the transactional file system 6 also records the meta information. The meta information is information necessary in managing the file system such as information necessary in managing vacant regions on the hard disks 10, information indicating correspondences between recording positions and names of all files that are managed on the hard disks 10. The meta information is recorded on the hard disks 10, and a part or a whole of the meta information will be read out to the buffer region 63 at a time of execution, rewritten in conjunction with addition, deletion or updating of files, and written back to the hard disks 10 at a time of the commit of the transaction similarly as the files on the buffer region 63.

Figure 3:
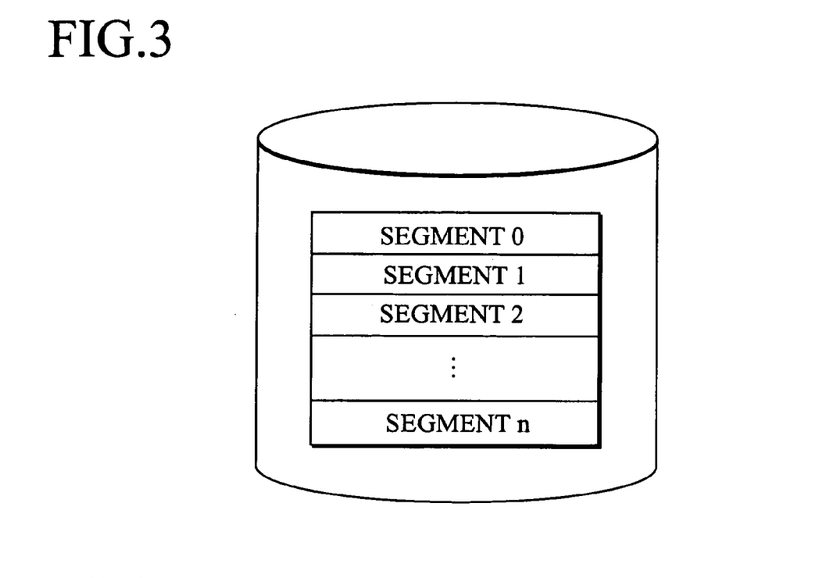
FIG. 3 is a diagram for explaining a hard disk region management used in the transactional file system of FIG. 1.

In the transactional file system 6 of this embodiment, the hard disk 10 is managed by dividing it into regions of a constant size called segments as shown in FIG. 3. The segment is allocated with a number, for example, so that it can be uniquely identified by that number. The size of the segment can be determined arbitrarily but it is preferable to make it sufficiently large such as 128 KB, for example, such that the overhead due to the seek time of the hard disk 10 becomes small even in the case of random access. Of course, it is possible to use only one hard disk 10 or a plurality of hard disks 10 simultaneously.

Figure 4:
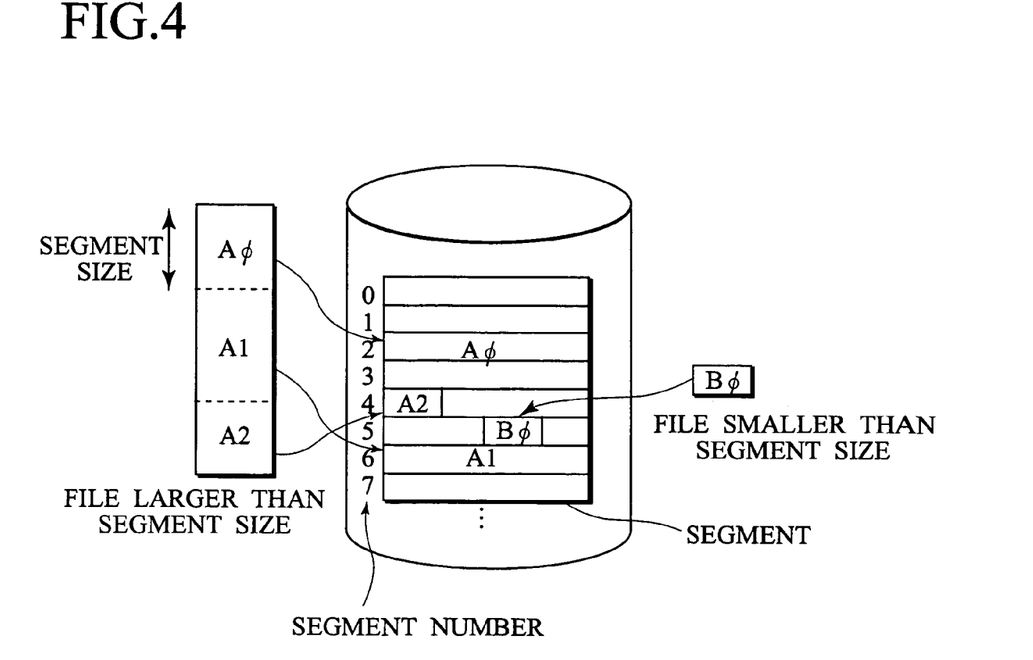
FIG. 4 is a diagram for explaining a correspondence between files and segments in the transactional processing system of FIG. 1.

The correspondence between the segments and the files are managed as shown in FIG. 4, for example. Namely, a region on the hard disk 10 is managed as sets of segments of a constant size, so that a file larger than the segment size will be divided into one or a plurality of blocks in the same size as the segment size and one block smaller than the segment size. In the example of FIG. 4, a file A that is larger than the segment size is divided into blocks A0 and A1 of the same size as the segment size and a block A2 which is smaller than the segment size. Each block of such a file that is divided into a plurality of blocks will be recorded into an appropriate vacant segment. At this point, block constituting one file may not necessarily be recorded into contiguous segments.

A file smaller than the segment size or the last block of a file larger than the segment size will be recorded into an appropriate vacant segment. At this point, if a plurality of blocks or files of such a size can be entered into one segment, they may be recorded in one segment together. Also, one such block or file that is smaller than the segment size may be recorded in division over two segments, but it is preferable to record it in one segment such that it can be read continuously by a single command at a time of reading.

The utilization state of the segments, that is which segment is in use and which segment is vacant, is recorded as "segment management information" in the meta information. The segment management information manages a correspondence between each segment number and its utilization state as shown in an example of FIG. 5.

Figure 5:
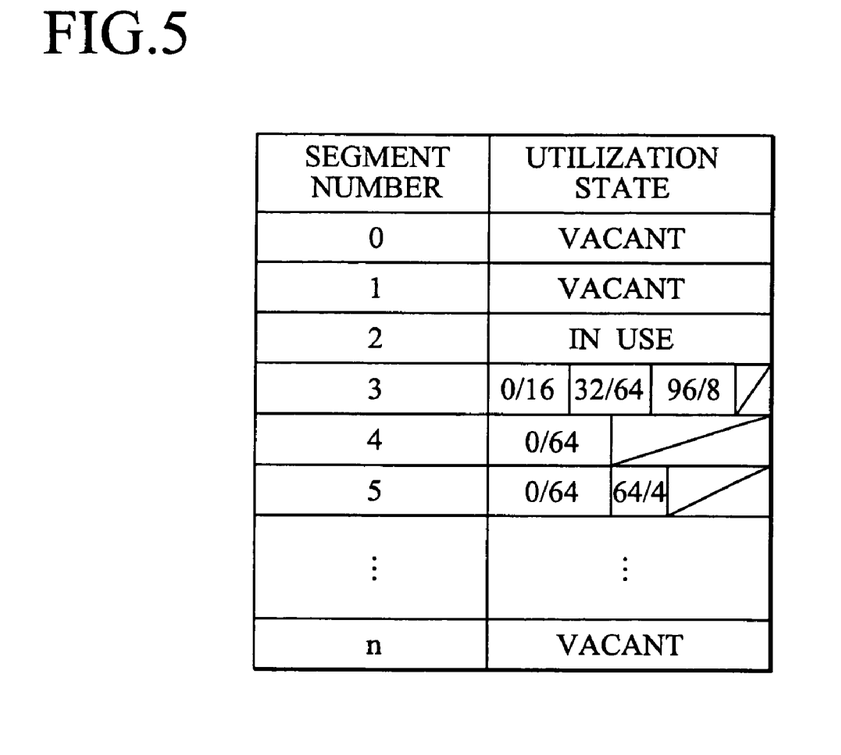
FIG. 5 is a diagram showing an example of a segment management information used in the transactional processing system of FIG. 1.

When a segment of a certain segment number is not in use, its utilization state is recorded as "vacant", as in the segment number "1" in the example of FIG. 5.

When an entire segment is in use as in the case where a segment of a certain segment number is used in recording a block of the segment size that constitutes a file larger than the segment size, its utilization state is recorded as "in use", as in the segment number "2" in the example of FIG. 5.

Also, when a plurality of files or blocks smaller than the segment size are recorded in a certain segment, which part of that segment is in use is recorded by a pair of an offset within the segment and a length, as in the segment number "3" in the example of FIG. 5. The utilization state of the segment number "3" records "0/16". "32/64" and "96/8", which indicates that, in the segment of the segment number "3", a region of a length 16 KB from an offset 0 KB, a region of a length 64 KB from an offset 32 KB and a region of a length 8 KB from an offset 96 KB are in use, and the rest is vacant, assuming that the offset and the length are expressed in units of KB in this example.

Figure 6:
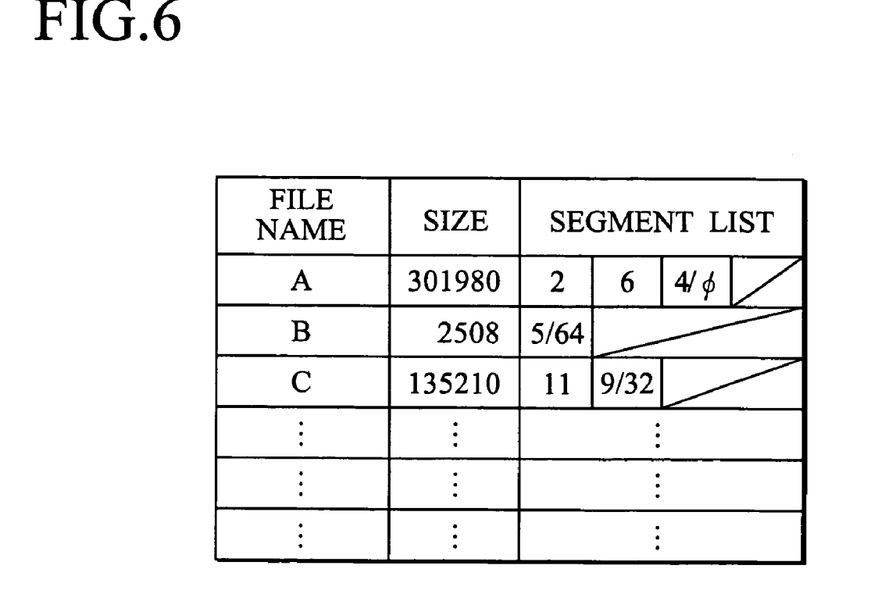
FIG. 6 is a diagram showing an example of a file arrangement information used in the transactional processing system of FIG. 1.

Segments which constitute each file is recorded as "file arrangement information" in the meta information. The file arrangement information is given in a form of a table of correspondence among each file name, its file size, and a list of segments at which this file is recorded, as shown in the example of FIG. 6. In the case of a file larger than the segment size, the segment list has the segment numbers of the segments that record one or a plurality of blocks of the segment size that constitute that file, and the segment number of the segment that records the last block not larger than the segment size and an offset within that segment. In the case of a file smaller than the segment size, the segment list has the segment number of the segment that records that file and an offset within that segment.

FIG. 6 indicates that the file A has a size of 301980 bytes and its top block in the segment size is recorded in the segment of the segment number "2", its second block in the segment size is recorded in the segment of the segment number "6", and its last block is recorded in the segment of the segment number "4" from a position at the offset of 0 KB, for example.

Next, a processing at a time of committing a transaction in the transactional file system of this embodiment will be described.

When a commit is commanded by specifying the transaction identifier, the operation unit 61 of the transactional file system 6 commands the commit processing to the input/output management unit 62. In the following, the operation of the input/output management unit 62 to which the commit processing is commanded will be described with reference to an example shown in FIG. 7.

Figure 7:
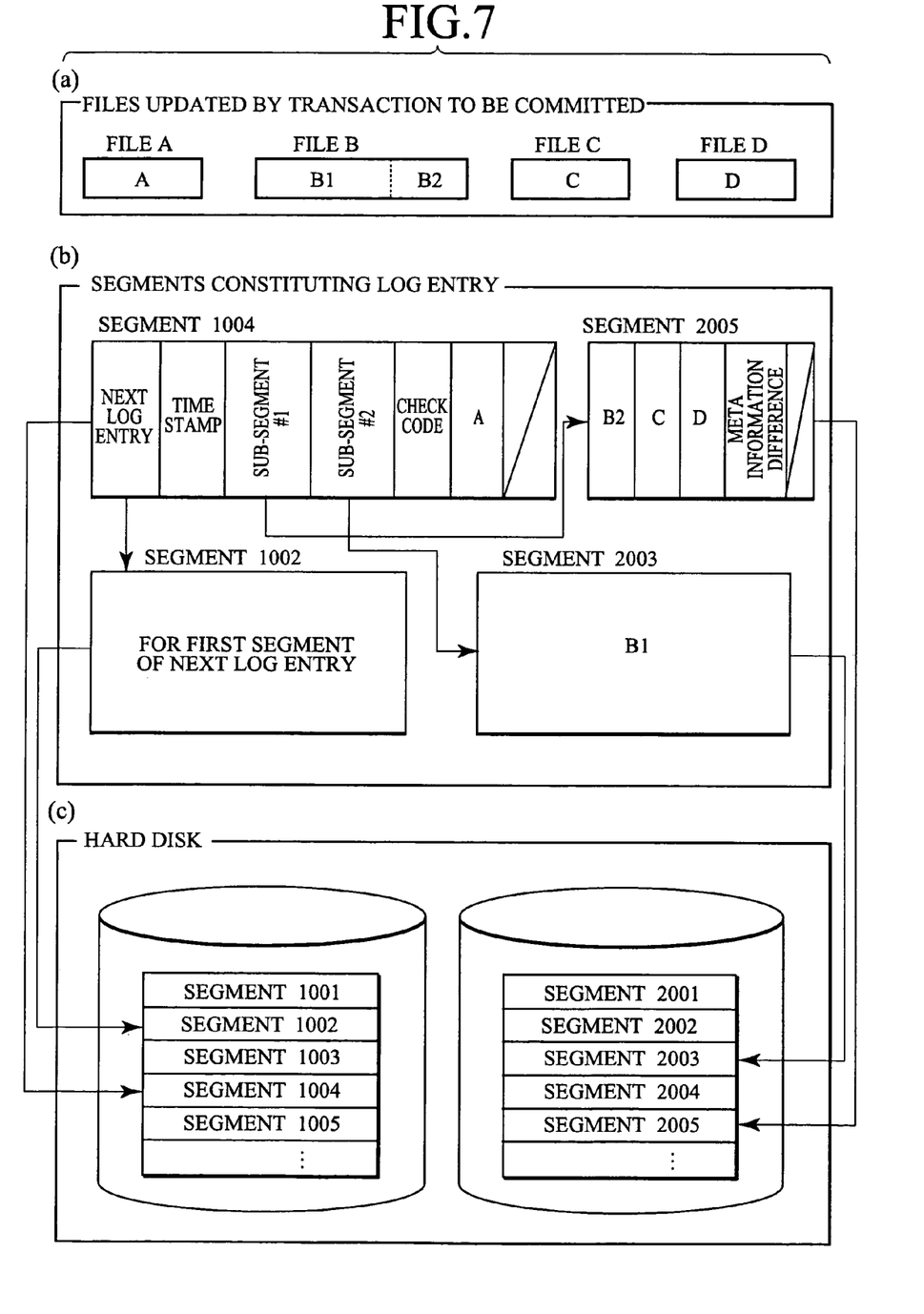
FIG. 7 is a diagram for explaining a log entry structure used in the transactional processing system of FIG. 1.

Here, as shown in a part (a) of FIG. 7, it is assumed that a transaction to be committed is updating four files A, B, C and D. Among them, the file B is assumed to be a file larger than the segment size, and files A, C and D are assumed to be files smaller than the segment size.

A set of update information to be written into the hard disk 10 at a time of the commit of this transaction will be referred to as "log entry". The log entry contains all the information regarding file updating by this transaction.

A part (b) of FIG. 7 shows an exemplary log entry. Also, parts (b) and (c) of FIG. 7 show an exemplary relationship between the log entry and the segments of the hard disk.

The log entry managed by the transactional file system 6 of this embodiment comprises one or a plurality of segments (three segments 1004, 2005 and 2003 in the example of a part (b) of FIG. 7), and every log entry has a segment number (1002 in the example of a part (b) of FIG. 7) at which a next log entry is recorded, so that the log entries can be traced sequentially.

In FIG. 7, it is assumed that a segment 1004 is the first segment for which the log entry of the transaction to be committed is to be entered. The log entry of the transaction to be committed here has a size corresponding to three segments, so that the other vacant segments 2003 and 2005 will be used in the log entry. These additional segments will be referred to as sub-segments. Also, in order to record the next log entry, a vacant segment 1002 is reserved in advance.

The log entry of the transaction to be committed here starts from the segment 1004 as shown in FIG. 7. The log entry records the following information (by distributing them over a plurality of segments according to the need):

(1) a segment number of a next log entry (a segment 1002 in FIG. 7);

(2) a timestamp attached to the log entry;

(3) segment numbers of sub-segments that constitute the log entry (segments 2003 and 2005 in FIG. 7);

(4) a check code for the purpose of judging whether the entire log entry is written correctly or not;

(5) the content information of the updated files; and (6) an information on a meta information difference resulting from rewriting due to the file update.

The segments are filled with these information, using appropriate padding such that the content information not greater than the segment size of a single file will not be divided into two segments.

Among these information, the check code is given by a CRC code or a checksum generated from data of all the segments (segments 1004, 2005 and 2003 in FIG. 7) that constitute the log entry. By checking whether this check code is correct or not with respect to the log entry recorded on the hard disk 10, it is possible to judge whether the entire log entry is written correctly or not.

The timestamp can be given by an actual time, or a sequence number that is incremented whenever the log entry is written. The timestamp will be used in judging whether a segment used in the log entry is a new log segment that is correctly written or an old log segment that is left over from an earlier occasion where this segment was also used in the log entry.

Figure 8:
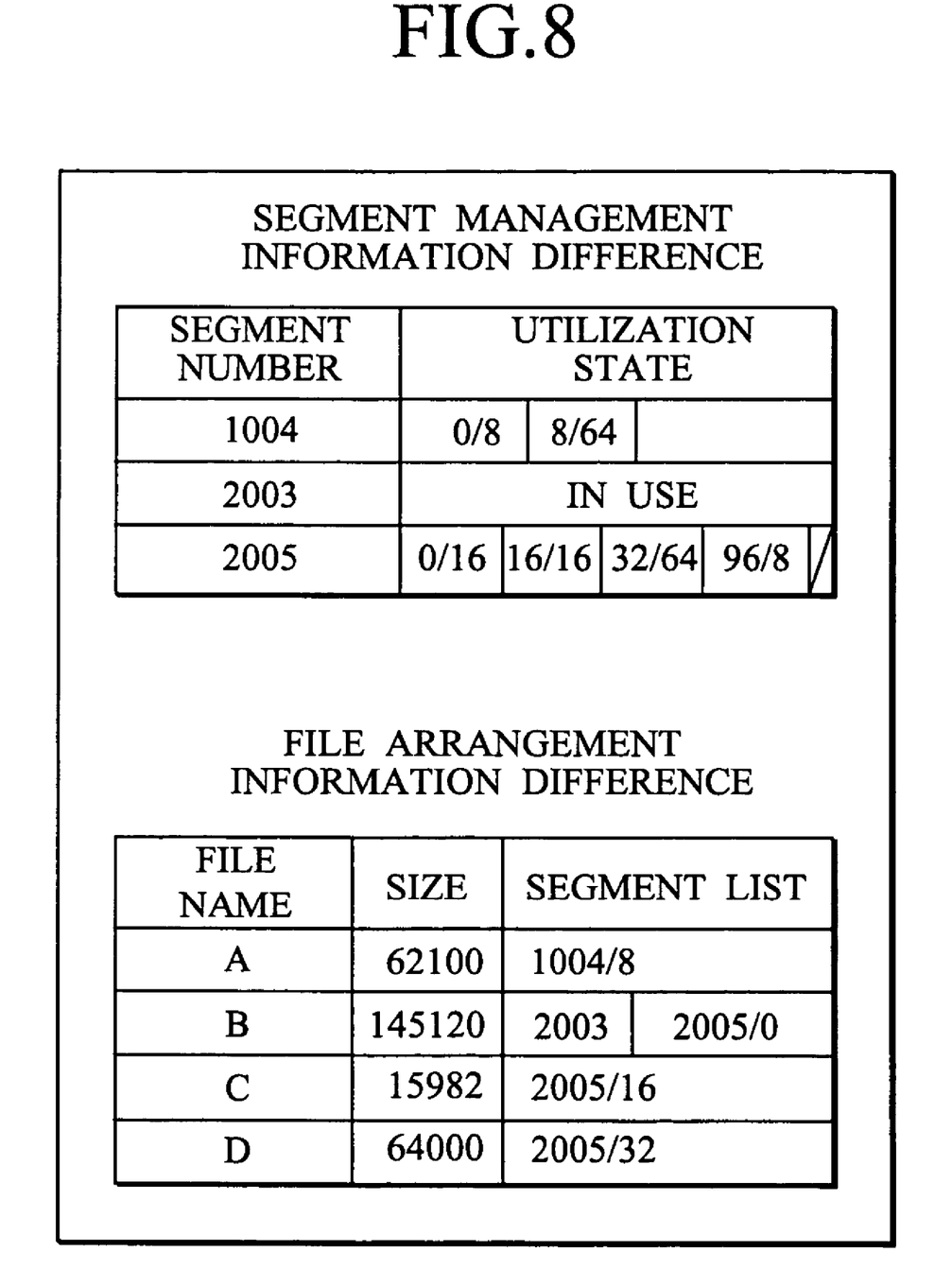
FIG. 8 is a diagram for explaining a meta information difference used in the transactional processing system of FIG. 1.

The meta information difference in the example of FIG. 7 is given as shown in an example of FIG. 8. The meta information difference contains an information on the segment numbers 1004, 2003 and 2005 that are contained in this log entry which is extracted from the segment management information, and an information on the files A, B, C and D that are updated by the transaction to be committed which is extracted from the file arrangement information.

When data of the segments constituting the log entry are determined in this manner, each log segment is written into the hard disk 10. When all the segments constituting the log entry are written into the hard disk 10, this transaction is regarded as committed.

In summary, the procedure of the commit processing to be carried out by the input/output management unit 62 is as follows, (1) A list of files updated by the transaction to be committed is obtained by referring to the transaction management table 64.

(2) The number of segments necessary in generating the log entry is checked by comparing the list of updated files and the file arrangement information.

(3) A segment that is to be the top segment of this log entry is already reserved in advance, so that if any other segments are necessary, vacant segments are searched by referring to the segment management information and their utilization states are set as "in use".

(4) A vacant segment for recording the log entry of the next transaction is searched by referring to the segment management information, and its utilization state is set as "in use" so as to reserve that segment.

(5) The meta information difference of the meta information updated by this transaction is extracted by the following steps.

(5-1) Only information of segments contained in this log entry is extracted from the segment management information.

(5-2) Only information of files updated by the transaction to be committed is extracted from the file arrangement information.

(6) The log entry is generated and this is written into the hard disk 10. This completes the commit processing.

The transactional file system 6 also has a need to carry out the abort processing. In the transactional file system 6 of this embodiment, only the update information due to the committed transaction is recorded in the hard disk 10. For this reason, the abort processing for the transaction can be completed by simply discarding the content information of files updated by that transaction on the buffer region 63, and cancelling the update of the meta information related to these files.

Now each log entry contains the meta information difference that is necessary in updating files contained in that log entry. At a time of execution, the meta information in the buffer region 63 is updated whenever the need arises but the complete meta information is not present on the hard disk 10, so that in the case of carrying out the recovery processing as the meta information in the buffer region 63 is lost due to fault or the like, there is a need to re-construct the meta information by using the meta information difference for the meta information on the hard disk 10. In order to make this recovery processing fast, it is possible to write a part or a whole of the meta information into the log entry at appropriate timing. In addition, it is also possible to record a position of that log entry at a prescribed location (a segment number "0" that is to be used exclusively for this purpose, for example) as a stable point. In this way, it suffices to re-construct the meta information by using the difference from the log entry at the recorded stable point at a time of carrying out the recovery processing after the occurrence of fault or the like, so that it is possible to realize the fast recovery processing. It is also possible to write the meta information in a prescribed location on the hard disk 10 or a location that can be traced from there, rather than the log entry.

Figure 9:
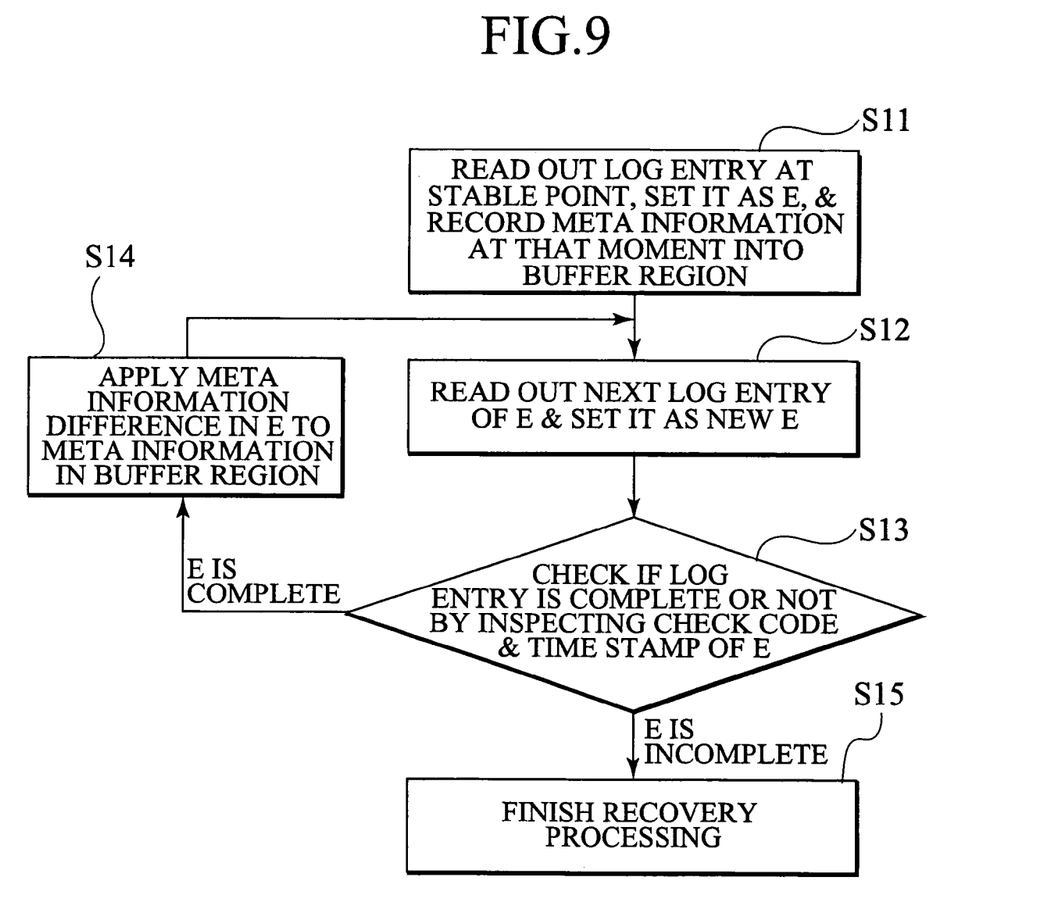
FIG. 9 is a flow chart showing an exemplary procedure for a recovery processing in the transactional processing system of FIG. 1.

FIG. 9 shows an exemplary procedure of the recovery processing using the log entry at the stable point.

First, the log entry at the stable point is read out and set as E, while the meta information at that moment is stored into the buffer region (step S11).

Then, the next log entry of E is read out and set as a new E (step S12).

Then, the check code and the timestamp of E are checked to judge whether the log entry is complete or not (step S13).

If E is complete, the meta information difference in E is applied to the meta information in the buffer region (step S14).

The processing of the steps S12 to S14 as described above is repeated while E is complete at the step S13.

When E is incomplete at the step S13, the recovery processing is finished (step S15).

Here, at a time of carrying out the recovery processing, the log entries are sequentially read out from the stable point by the procedure of FIG. 9 and there is a need to judge up to which log entry are the correctly committed ones. In the transactional file system 6 of this embodiment, it is possible to judge whether the log entry is the correctly committed one or not by using the check code and the timestamp recorded in that log entry. If the segments constituting the log entry are not all written, the calculated check code will be different from the recorded check code so that it can be easily checked that this log entry is not correct one.

Now. in the description up to this point, only information of files updated by one transaction is entered into one log entry, but it is also possible to enter file update information for a plurality of transactions collectively into one log entry and commit these transactions collectively.

In this case, if there is a file that is sequentially updated by more than one transactions among these transactions to be committed collectively, only information on update by the transaction that updated this file last can be left in the log entry and information on update by the other transactions can be discarded. In this way, it is possible to reduce the amount of data to be written into the hard disk 10 for information on update of a so called hot spot file which is frequently updated by many transactions, so that it is possible to improve the performance.

Now, in the example of FIG. 6, the information on files updated by one transaction is all entered into the log entry and written into the hard disk 10 at a time of the commit. For this reason, there can be cases where the commit processing becomes time consuming as in the case where one transaction made an update of a large file. In such a case, it is possible to carry out the optimization in which a part of a whole of the content information of the file updated by the transaction, i.e., data written by the transaction, is written into the hard disk 10 before the commit, and the meta information difference information and the remaining content information that is not yet written if any are contained in the log entry at a time of committing the transaction. This optimization can improve the performance in the case where a large file is to be processed sequentially from its top and the processed portion can be written into the hard disk 10 without waiting for the commit. In this case, if this transaction is aborted, the update can be cancelled by simply resetting the segments into which the content information of the file is written, as vacant regions.

Figure 10:
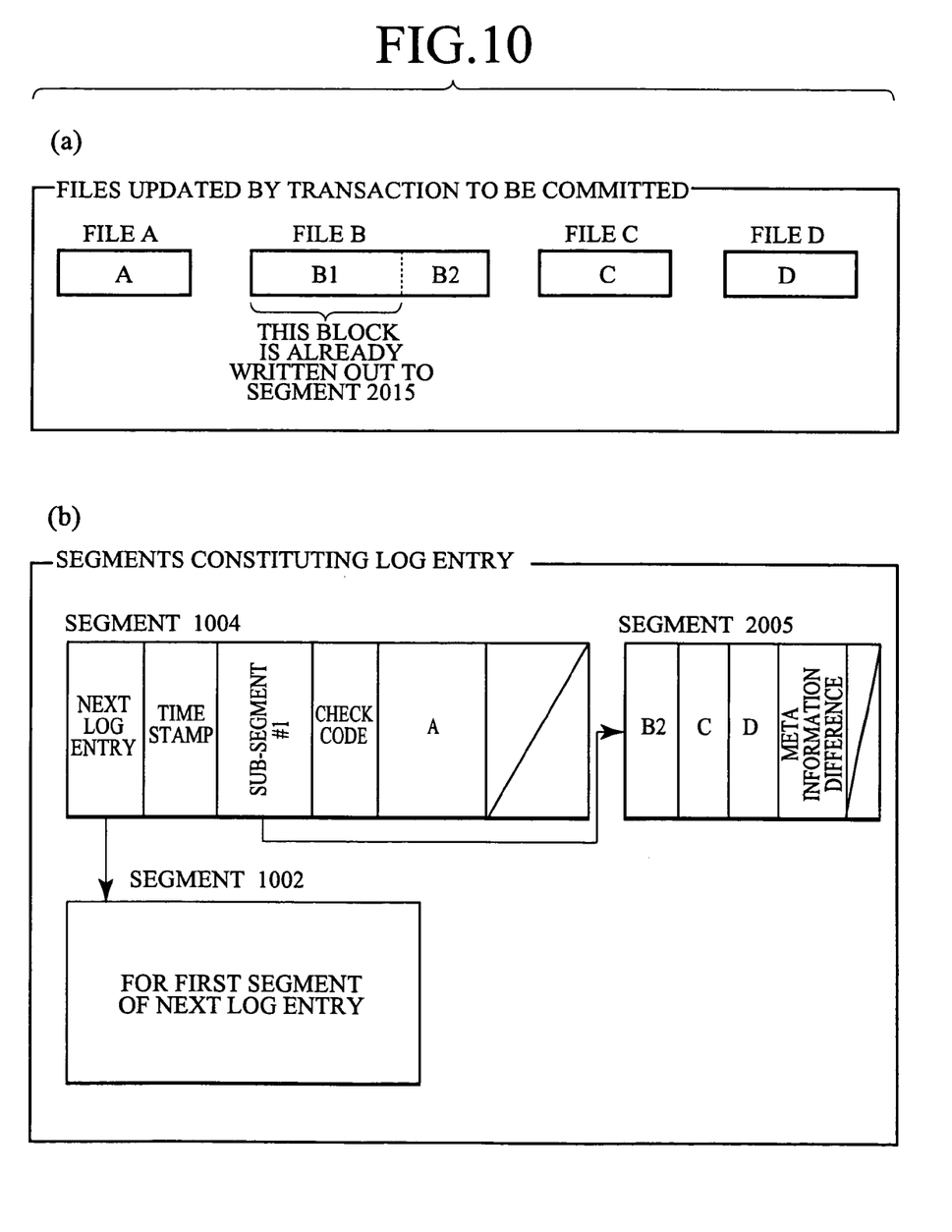
FIG. 10 is a diagram for explaining a log entry for a transaction for which advanced writing was made in the transactional processing system of FIG. 1.
Figure 11:
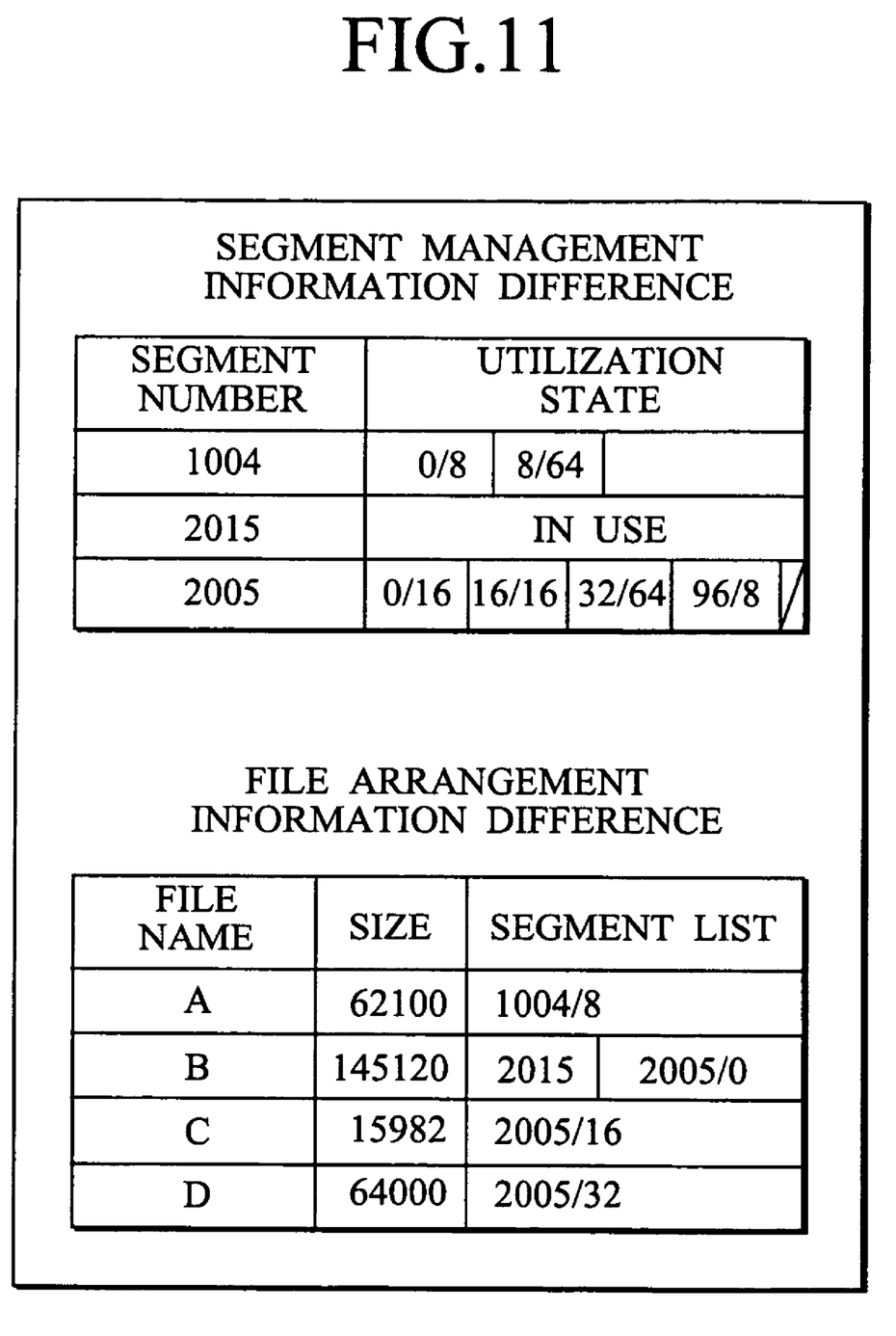
FIG. 11 is a diagram for explaining a meta information difference in the case of using advanced writing in the transactional processing system of FIG. 1.

The exemplary commit processing for the transaction for which advanced writing of the content information of the updated file is made in this manner will be described with reference to FIG. 10. A part (a) of FIG. 10 shows exemplary files updated by the transaction to be committed, and a part (b) of FIG. 7 shows exemplary segments constituting the log entry. In this example, it is assumed that the transaction to be committed has updated four files A, B, C and D similarly as in the example of FIG. 7. Here, however, it is assumed that the top block B1 of the file B is already written into the segment of the segment number 2015 before the commit processing, unlike the example of FIG. 7. In such a state, the log entry of this transaction is formed as shown in a part (b) of FIG. 10. Namely, the block B1 is not contained in the log entry, unlike the case of FIG. 7. The meta information difference contained in this log entry is as shown in FIG. 11. The meta information difference of FIG. 11 contains information on the segment of the block B1. In other words, the meta information of the segment for which the advanced writing was made is contained in the log entry at a time of the commit of that transaction.

Note that, in the case where the advanced writing was made, there is a need to carry out the writing of the log entry of that transaction after confirming that the advanced writing is completely finished. Also, the segment management information corresponding to the segment used in the advanced writing remains as "in use" on the buffer region 63 until the log entry of that transaction is written, but remains "vacant" on the hard disk 10. For this reason, this segment will be reset as "vacant" automatically in the case where the transaction is not committed because the system is disabled due to fault.

Now, in the description up to this point, the case where the transaction processing system has one transactional file system has been considered. However, it is of course possible for the transaction processing system to have a plurality of transactional file systems. For example, it is possible to consider the case where two disk arrays are used in conjunction with two transactional file systems, such that two transactional file systems are used separately depending on the data types. Even in such a case, if one transaction updates files in both transactional file systems, there is a need to commit the transaction in an atomic manner with respect to all the files. However, if these transactional file systems manage the respective log entries independently, there can be cases where the log entry in one transactional file system is correctly written but the system is disabled due to fault before the log entry of the other transactional file system is written so that only the log entry on one side is valid and the system falls into a state of no overall consistency.

In order to prevent the system from falling into such a state of no overall consistency, when the same transaction updates files in a plurality of transactional file systems, information for identifying the log entry of the other transactional file system is embedded into the log entry of each transactional file system and written into the stable memory device corresponding to each transactional file system. This transaction is regarded as committed at a time where the log entries of all the transactional file systems are written.

By generating the log entry in this manner, the log entry of one transactional file system is valid only when the log entry of the other transactional file system that is embedded therein is also valid at the same time. For this reason, at a time of the recovery processing, when the meta information is to be recovered by tracing the log entries in the respective transactional file systems by the procedure of FIG. 9, whether the log entry of the other transactional file system that is embedded in the log entry is correctly recovered or not is checked, and the subsequent log entries are invalidated if it is not correctly recovered. In this way, it is possible to recover a state with overall consistency.

Now, this transactional file system can be easily merged with the multimedia file system that handles stream data or continuous data such as video data. In such a case, it is preferable for this transactional file system to carry out input/output in a large segment size in order to improve the performance by writing the file update as log into the stable memory device such as hard disk. Even in the case of handling stream data, it is preferable to carry out input/output in a large size in order to improve the utilization efficiency of the stable memory device such as hard disk while maintaining the continuity so that the stream data will not be interrupted. To this end, this transactional file system and the multimedia file system that handles stream data can carry out a unified segment region management. For example, the segment size in this transactional file system can be set equal to the data size used for input/output of the continuous data.

According to the present invention, it is possible to realize a high performance transactional file system in which a plurality of files updated by the transaction can be reflected on the file system in an atomic manner at a time of the commit, and updates made before the abort can be cancelled at a time of the abort.

Also, according to the present invention, the log entry containing the information on updates made by the transaction is written into the stable memory device such as hard disk in units of segments, for example, such that the writing in a large size is carried out and therefore the overhead due to seeking by head or the like can be reduced. Also, the files are recorded in contiguous regions on the stable memory device in units of the segment size at most, so that the overhead due to seeking or the like at a time of reading can also be reduced. As a result, it becomes possible to realize a high performance transactional file system by effectively utilizing the input/output performance of disks.

Also, according to the present invention, by the recovery processing at a time of the occurrence of fault, it is possible to avoid losing the files updated by the committed transaction while cancelling updates made by the non-committed transaction. The recovery processing can be carried out fast by a simple procedure by tracing the chain of the log entries while checking whether each log entry is correct or not.

Also, in the transactional file system of the present invention, the log entry is divided into blocks of the segment size and the chain among the log entries is managed, so that it is not necessary to write the log entries sequentially in physically contiguous regions. For this reason, there is no need to secure the contiguous regions for the log entries by collecting unused regions on the hard disk using the garbage collection, so that the region management on the stable memory device can be simplified and the overhead can be reduced.

Thus, according to the present invention, the log entry containing the update information regarding a plurality of files updated by the transaction is generated at a time of the commit of the transaction, and this log entry is written into the stable memory device, so that a plurality of files updated by the transaction can be reflected on the file system in an atomic manner at a time of the commit, updates made before the abort can be cancelled at a time of the abort, and the recovery processing can be carried out fast by a simple procedure.

Here, the plurality of files may have various different sizes or the like. Also, the update may include a creation of a new file, a modification of a content of an existing file, and a deletion of a file. Also, the meta information of the updated files is effectively an information for validating the updated files collectively on the stable memory device. Also, the stable memory device is a memory device whose stored contents will not disappear even when the power is turned off, such as hard disk or the like.

In the present invention, by writing the above described log entry into the stable memory device at a time of the commit of the transaction, it is possible to guarantee that the system is in either a state in which all the updates made by one transaction with respect to one or a plurality of files since the start of its processing until the time of the commit are valid on the stable memory device (commit), or a state in which they are all invalid (abort). Even when a fault occurs in the system, it is impossible to have a state where only a part of the updates made by one transaction are valid while the others are invalid. According to this file management method, the file system itself can realize the atomicity of transactions (atomic writing).

It is to be noted that the above described embodiment according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the transactional file system of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A transactional file management method, comprising:
(a) generating a log entry containing an information for validating all updates made by a transaction collectively on a stable memory device, for a plurality of files updated on a buffer region by the transaction since a start of a processing of the transaction until a commit of the transaction,
wherein the step (a) generates the log entry by embedding in the log entry an information by which, whether the log entry has been written into the stable memory device completely or not, can be checked; and
(b) writing the log entry into the stable memory device at a time of the commit of the transaction such that the plurality of files updated by the transaction can be reflected on a file system in an atomic manner at a time of the commit and updates made before an abort can be cancelled at a time of the abort.

2. The transactional file management method of claim 1, wherein the step (a) generates the log entry that contains a meta information and a content information for all of the one or more files updated by the transaction.

3. The transactional file management method of claim 1, further comprising the step of:
writing a part or a whole of a content information of the one or more files updated by the transaction into the stable memory device before the commit of the transaction;
wherein the step (a) generates the log entry that contains a meta information for all of the one or more files updated by the transaction and any part of the content information that is still not written into the stable memory device.

4. The transactional file management method of claim 1, further comprising the step of:
invalidating all the updates made by the transaction collectively when the log entry read out from the stable memory device after an occurrence of fault indicates that the log entry has been written incompletely.

5. The transactional file management method of claim 1, wherein the step (b) writes the log entry into the stable memory device by embedding a position information on the stable memory device for writing a next log entry corresponding to another transaction to be committed next, into the log entry.

6. The transactional file management method of claim 1, wherein the step (a) generates a unified log entry for updates made by a plurality of transactions when a plurality of transactions are collectively committed.

7. The transactional file management method of claim 6, wherein the step (a) generates the log entry such that, when two or more transactions are updating an identical file on the buffer region, the log entry contains only an update content of the identical file by one transaction that is committed last among the two or more transactions.

8. A transactional file management method, comprising:
(a) generating a log entry containing an information for validating all updates made by a transaction collectively on a stable memory device, for one or more files updated on a buffer region by the transaction from a start of a processing of the transaction until a commit of the transaction; and
(b) writing the log entry into the stable memory device at a time of the commit of the transaction,
wherein the step (a) generates the log entry by embedding in the log entry an information by which whether the log entry has been written into the stable memory device completely or not can be checked, and
wherein the step (b) writes the log entry into the stable memory device by dividing the log entry into segments of a constant size.

9. The transactional file management method of claim 8, wherein the step (a) generates the log entry that contains a meta information and a content information for all of the one or mare files updated by the transaction.

10. The transactional file management method of claim 8, further comprising the step of:
writing a part or a whole of a content information of the one or more files updated by the transaction into the stable memory device before the commit of the transaction;
wherein the step (a) generates the log entry that contains a meta information for all of the one or more files undated by the transaction and any part of the content information that is still not written into the stable memory device.

11. The transactional file management method of claim 8, wherein the step (b) writes the log entry into the stable memory device by embedding a position information on the stable memory device for writing a next log entry corresponding to another transaction to be committed next, into the log entry.

12. The transactional file management method of claim 8, wherein the step (a) generates a unified log entry for updates made by a plurality of transactions when a plurality of transactions are collectively committed.

13. A transactional file system for managing files stored in a stable memory device and providing the files to processing by transactions, comprising:
a log entry generation unit configured to generate a log entry containing an information for validating all updates made by a transaction collectively on a stable memory device, for a plurality of files updated on a buffer region by the transaction since a start of a processing of the transaction until a commit of the transaction, and configured to generate the log entry by embedding in the log entry an information by which, whether the log entry has been written into the stable memory device completely or not, can be checked; and
a log entry writing unit configured to write the log entry into the stable memory device at a time of the commit of the transaction such that the plurality of files updated by the transaction can be reflected on a file system in an atomic manner at a time of the commit and updates made before an abort can be cancelled at a time of the abort.

14. A computer usable medium having computer readable program codes embodied therein for causing a computer to function as a transactional file system for managing files stored in a stable memory device and providing the files to processing by transactions, the computer readable program codes include:
a first computer readable program code for causing said computer to generate a log entry containing an information for validating all updates made by a transaction collectively on a stable memory device, for a plurality of files updated on a buffer region by the transaction since a start of a processing of the transaction until a commit of the transaction, and for generating the log entry by embedding in the log entry an information by which, whether the log entry has been written into the stable memory device completely or not, can be checked; and
a second computer readable program code for causing said computer to write the log entry into the stable memory device at a time of the commit of the transaction such that the plurality of files updated by the transaction can be reflected on a file system in an atomic manner at a time of the commit and updates made before an abort can be cancelled at a time of the abort.

* * * * *